United States Patent [19]
Michaels

[11] Patent Number: 5,826,396
[45] Date of Patent: Oct. 27, 1998

[54] DOUBLE-SIDED, SINGLE PASS GROOVING OF COUNTERTOPS AND OTHER BUILDING STRUCTURES

[76] Inventor: Walter Michaels, 2060 Emery St. #233, La Habra, Calif. 90631

[21] Appl. No.: 807,573

[22] Filed: Feb. 27, 1997

Related U.S. Application Data

[60] Provisional application No. 60/028,779 Oct. 18, 1996.

[51] Int. Cl.⁶ .............................. E04C 2/30; A47B 13/10
[52] U.S. Cl. ........................... 52/631; 108/27; 312/140.3
[58] Field of Search ................................. 52/631, 782.21; 108/27; 312/140.4, 140.1, 140.3

[56] References Cited

U.S. PATENT DOCUMENTS

| | | | |
|---|---|---|---|
| 2,002,228 | 5/1935 | Meyercord et al. | 52/631 X |
| 2,181,164 | 2/1939 | Alexander | 52/631 |
| 2,635,308 | 4/1953 | Crook | 52/631 |
| 3,606,508 | 9/1971 | Burnes | 52/782.22 X |
| 4,019,303 | 4/1977 | McAllister | 52/631 X |

*Primary Examiner*—Christopher Kent
*Attorney, Agent, or Firm*—Robert D. Fish

[57] ABSTRACT

Methods, apparatus and products are provided in which a building structure is fabricated from a sheet by placing grooves in two sides of the sheet during a single pass, the grooves at least partially define multiple sections, and then folding up at least two of the sections at one or more of the grooves to form one or more joints. Preferred building structures include a countertop having a backsplash joint and an overhanging edge joint, and especially preferred building structures comprise a plastic solid surfacing material such as Corian™, Fountainhead™, Surell™, Avonite™, Gibraltar™ and Swan Stone™.

20 Claims, 3 Drawing Sheets

41 42 43 44 45

DOUBLE-SIDED, SINGLE PASS GROOVING OF COUNTERTOPS AND OTHER BUILDING STRUCTURES

This application claims the benefit of U.S. Provisional Application Number 60/028,779, filed Oct. 19, 1996.

FIELD OF THE INVENTION

The field of the invention is building materials, especially countertops.

BACKGROUND OF THE INVENTION

"Plastic solid surfacing materials" (which may also be referred to herein as "PSSM" or "PSSMs") are polymer based building materials. PSSMs typically comprises polyesters or acrylics, or copolymers thereof, and may additionally contain smaller quantities of other components or additives to form desired characteristics such as color and visual patterns. PSSMs are generally manufactured and sold in sheet form, which may or may not be laminated or foamed. PSSMs are commonly used in building and construction trades to form countertops, walls, shower surrounds, and other building structures.

PSSMs are available from several U.S. manufacturers. One such manufacturer, E. I. duPont de Nemours & Co., Inc. of Wilmington, Del. 19898, U.S.A., markets its PSSM under the trademark of "CORIAN"™, and U.S. Pat. No. 3,847,865 issued Nov. 12, 1974 to R. B. Duggins and assigned to E. I. duPont de Nemours & Co., teaches one formula for making CORIAN™-type products. Another manufacturer is the Nevamar Corporation, 8339 Telegraph Rd., Odenton, Md. 21113, U.S.A., which markets its PSSM product under the name, FOUNTAINHEAD™. A third manufacturer is the Formica Corporation, located at 155-T Rte. 46, W., CN-980, Wayne, N.J. 07470, U.S.A., which markets its PSSM under the trademark name of SURELL™. Other manufacturers of PSSMs include AVONITE™, GIBRALTAR™ and SWAN STONE™.

PSSMs such as CORIAN™, FOUNTAINHEAD™ and SURELL™ have numerous advantages over other materials such as wood, metal, ceramic tile, and high pressure plastic laminates. One advantage is the relative ease of refinishing which results from the color or decorative color patterns apparent on the surface extending more or less throughout the entire thickness of the sheet. Thus, if a PSSM does become stained, burned or scratched so deeply that the damage cannot be removed with a common household abrasive cleanser, the damage can be easily removed by light sanding with steel wool or fine sand paper. PSSMs are also advantageous in that they are typically quite hard, dense and rigid, and are resistant to chipping, cracking, splitting, warping, burning, and staining. Another attractive quality is that PSSMs can be cut or shaped using router bits, power saws and shapers similar to those used to cut and shape wood. Additionally, pieces or sections of PSSMs can be strongly bonded to each other using adhesive bonding.

PSSMs are relatively expensive to form into complex structures often used in building and construction. The chief problem is that the wide range of applications, along with a wide range of colors, patterns, configurations and dimensions makes stocking of all available permutations unrealistic. Thus, integral one-piece PSSM countertops are generally limited to relatively short, narrow, straight lengths employed with bathroom vanities, while the majority of PSSM countertops having backsplashes and/or overhanging edges are generally custom cut from sheet material, and then assembled in either a countertop fabrication shop or at the installation site.

As used herein, the terms "countertop" and "countertops" refer to any elongated work space such as may be found in kitchens, bathrooms, workshops, offices, and many other locations. Countertops do not necessarily imply an underlying cabinet, and therefore include commercial bathroom "Pullman" type counters in which the counter portion is held in position via some combination of legs and wall brackets, rather than by an underlying cabinet. Countertops vary greatly in complexity from something as simple as an elongated piece of plywood, to something as complex as a unitized solid piece of plastic having a backsplash, overhanging edge, sink or other cutout, and involving one or more corners.

There are several known systems for custom fashioning countertops having projections such as backsplashes and overhanging edges. One of the simplest solutions involves cutting separate counter and backsplash, or counter and overhanging edge pieces, and then gluing the various pieces together in a butt-joint. While relatively simple to fabricate, countertops produced in this manner may be undesirable because, among other things, the seams may be relatively weak, and both dirt and water may tend to accumulate along the seams.

A more complicated solution for the backsplash involves the fashioning of a radius interior corner joint (also known as a "coved" joint) between the counter and backsplash pieces. Coved joints can be fabricated according to many different methods, such as gluing additional pieces into the right angle joint and then routing out the cove shape. Another known method involves countersinking the lengthwise bottom edge of the backsplash piece and an overhanging edge of an elongated rectangular strip into a rabbet formed along the upper lengthwise back edge of the counter piece. A portion of the rectangular strip is then mechanically removed using a router to define a coved or curved joint. Both of these methods, however, are time-consuming and require considerable skill.

Other solutions also involve cutting multiple pieces and gluing them together. For example, in U.S. Pat. No. 5,452,666 to Peters a backsplash portion having a front lower lengthwise edge defining a coved lip is glued into a mating configuration cut into the counter portion. In U.S. Pat. No. 4,814,220 to Brathwaite, an edge portion is precut, and then mated into a slot cut into the counter portion.

It is also known to provide joints in countertops without cutting the substrate material into multiple pieces. For example, it is known to cut one or more grooves in a sheet of wood, PSSM or other countertop material, and then fold and glue the sheet at the groove(s) to form a joint. This fabrication process is similar to that used in the manufacture of cabinets and other box-like products, and has numerous advantages over previous processes, including relatively low costs and the production of strong joints. Even the known grooving processes, however have serious drawbacks. One of the most serious problems is that all known countertop cutting/grooving machines provide grooves on only one side of the sheet at a time, and thus require multiple passes to fabricate a completed countertop. This limitation makes good sense from a manufacturing perspective since: (1) grooves must be cut in opposite sides of the sheet to produce the backsplash and overhanging edge portions; (2) the grooves needed to form the backsplash have quite different shapes from those needed to form the overhanging edge portion; (3) the grooves needed to form the backsplash and overhanging edge portions are positioned at quite different distances from opposite overhanging edges of the sheets; and (4) countertop sheets from even a single manufacturer vary considerably in thickness, and accommodating the varying thicknesses would necessarily involve thickness adjustments for every single run.

The multiple pass limitation in fabrication of countertops and other structures, however, is problematic in that it involves significant additional cost. For example, multiple pass fabrication requires removal and repositioning of the cutting tool to accommodate both backsplash and overhanging edge grooves, and physical rotation of the substrate sheet about its long axis by 180°. Both of these processes are time consuming and expensive. Thus, there is a continued need for methods and apparatus to fabricate relatively complex structures such as countertops having both backsplashes and overhanging edges.

SUMMARY OF THE INVENTION

The present invention is directed to methods, apparatus and products in which a building structure is fabricated from a sheet by placing grooves in two sides of the sheet during a single pass, the grooves at least partially defining multiple sections, and then folding at least two of the sections at one or more of the grooves to form one or more joints.

In preferred embodiments, the building structure comprises a countertop having a backsplash joint and an overhanging edge joint, and in especially preferred embodiments the building structure comprises a plastic solid surfacing material such as Corian™, Fountainhead™ and Surell™.

Various objects, features, aspects and advantages of the present invention will become more apparent from the following detailed description of preferred embodiments of the invention, along with the accompanying drawings in which like numerals represent like components.

DETAILED DESCRIPTION

Figure 1A:
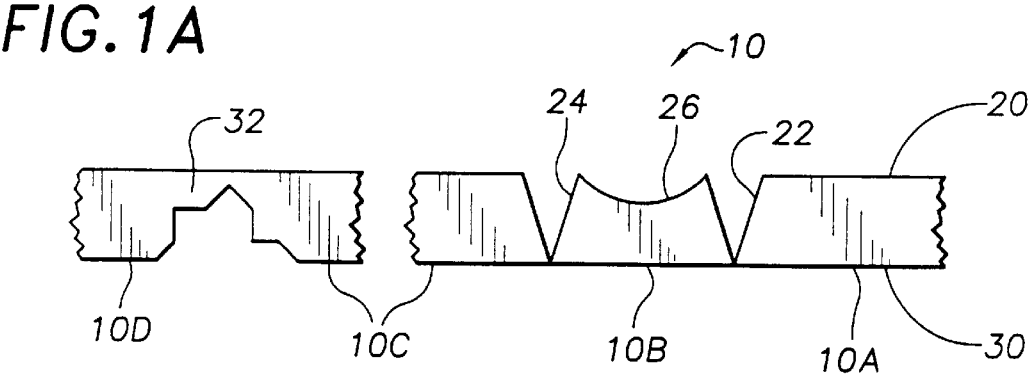
FIG. 1A is an end view of a sheet having grooves use to form a coved backsplash joint and a stair-step joint.

Referring first to FIG. 1A a sheet 10 or other workpiece has a first side 20 and a second side 30, which, depending on orientation of the sheet 10 may comprise top and bottom sides, respectively. There are two grooves 22 and 24 cut into the first side 20 to define first, second and third sections 10A, 10B and 10C, respectively. Section 10B is positioned intermediate sections 10A and 10C, and is recessed at recess 26. There is also another groove 32 cut into the second side 30, which thereby defines sections 10D and 10E.

Figure 1B:
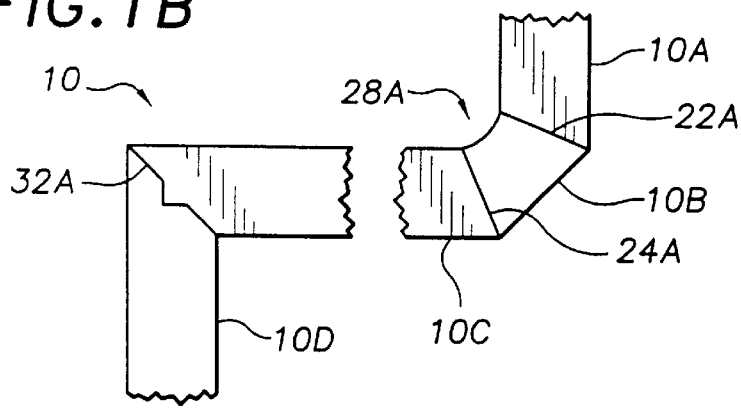
FIG. 1B is an end view of a countertop formed from the sheet of FIG. 1A.

FIG. 1B shows the configuration provided when the sheet 10 of FIG. 1A is folded at grooves 22, 24 and 32 to form joints 22A, 24A and overhanging edge joint 32A. In appropriate applications, the configuration could function as a countertop, with section 10A forming a backsplash portion, section 10B forming a coved portion, section 10C forming a counter portion, and section 10D forming an overhanging edge portion. In this configuration, joints 22A and 24A, along with coved portion 10B cooperate to form backsplash joint 28A.

Figure 2A:
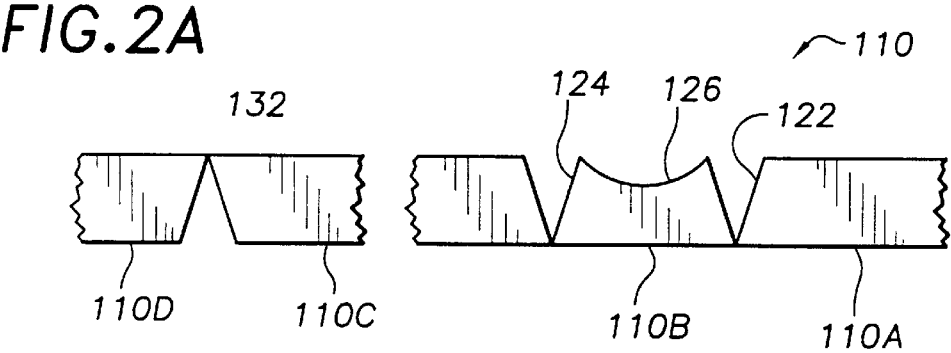
FIG. 2A is an end view of a sheet having grooves use to form a coved backsplash joint and a mitre lock joint.
Figure 2B:
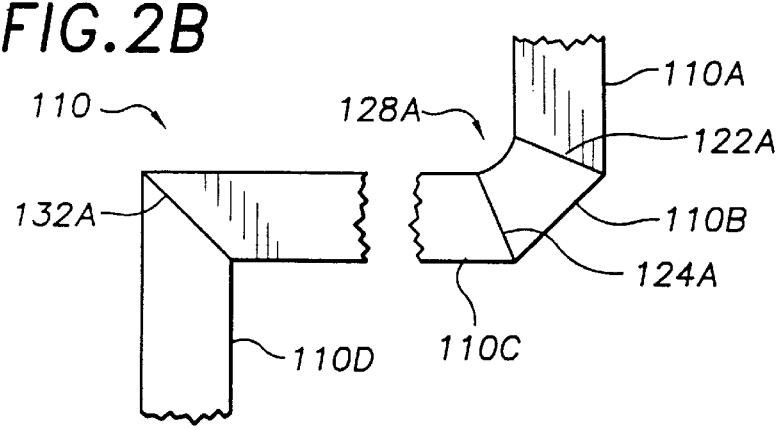
FIG. 2B is an end view of a countertop formed from the sheet of FIG. 2.

FIGS. 2A and 2B show an alternative configuration in which the various components of FIGS. 1A and 1B are substituted by corresponding components in which the reference numerals have been increased by 100. Thus, groove 32 is replaced by groove 132, and sheet 110 can be folded at groove 132 to form overhanging edge joint 132A. Similarly, joints 122A and 124A, along with coved portion 110B cooperate to form backsplash joint 128A.

Figure 3A:
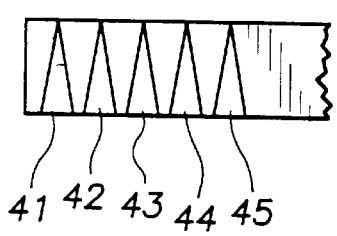
FIG. 3A is an end view of a sheet having grooves used to form a bull nose.
Figure 3B:
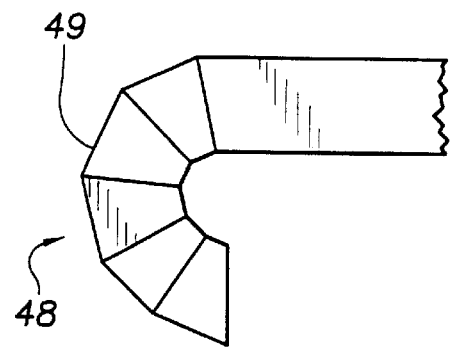
FIG. 3B is an end view of a countertop formed from the sheet of FIG. 3A.

FIGS. 3A and 3B show a portion of an alternative configuration in which "V" grooves 42, 42, 43, 44 and 45 can be folded to form a bull nose 48. In this particular example five grooves were used to cooperatively form the bull nose, but other configurations and numbers of grooves could be used as well. Also in this example, the outer edge 49 of the bull nose 48 could be sanded or otherwise shaped to have a smoother presentation.

Figure 4A:
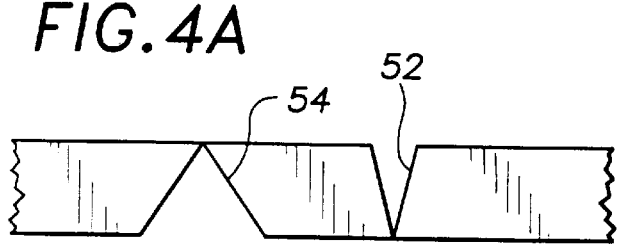
FIG. 4A is an end view of a sheet having grooves used to form a no drip edge and a scribe strip.
Figure 4B:
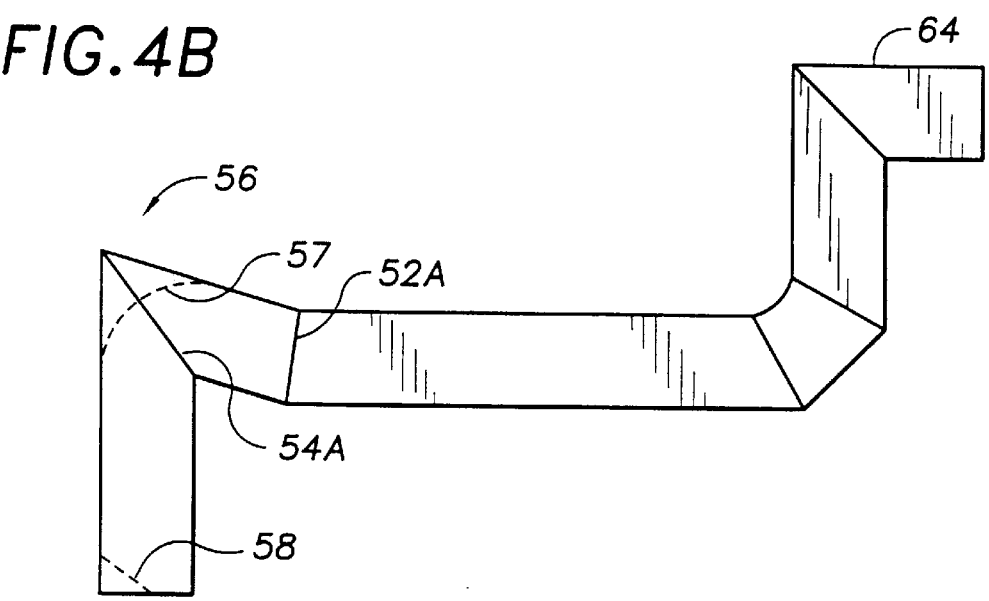
FIG. 4B is an end view of a countertop formed from the sheet of FIG. 4A.

FIGS. 4A and 4B show a portion of an alternative configuration in which grooves 52 and 54 can be folded into joints 52A and 54A, respectively, to form a no drip edge 56, and another groove (not shown) can be folded to form a scribe strip 64. The no-drip edge preferably rises about ¼" above the upper surface of the counter, and can be rounded off as shown in phantom lines 57 and 58.

Figure 5A:
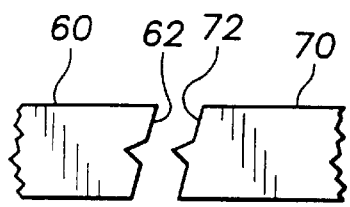
FIG. 5A is an end view of a sheet having grooves used to form an indexed sheet join.
Figure 5B:
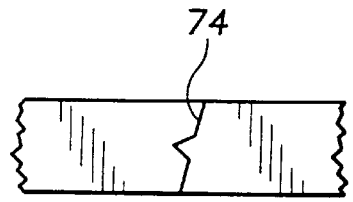
FIG. 5B is an end view of a countertop formed from the sheet of FIG. 5A.

FIGS. 5A and 5B show an alternative configuration in which two different pieces 60, 70 are cut in such a manner that their edges 62, 72 cooperate to form an indexed sheet join 74.

As used herein, the term "sheet" refers to a broad structure in which the longest and widest dimensions are each at least ten times the smallest thickness. Sheets need not be completely planar, and may instead include at least some portions which are rolled, twisted, or warped, and may also include one or more projections or extrusions such as texturing or edge lips. It is also not necessary for sheets to be completely smooth. In fact, many commercially available sheets used in the fabrication of countertops are finished on only one side. The sheets of FIGS. 1–4, are preferably predominantly planar structures measuring about 30 inches wide by 12 feet long by ¼ to ¾ inches thick, and are preferably manufactured from a plastic solid surfacing material such as CORIAN™, Fountainhead™ and SURELL™. Other sheeted materials may also be used, however, including wood, laminated plastics or woods, and even stones such as granite.

As used herein the term "groove" refers to an elongated, narrow channel or depression, such as would be produced by cutting into a sheet during relative translation between the sheet and a cutter or router. A groove placed in a material defines at least two sections of the material, one on either side of the groove. More than two sections are formed where the groove crosses either a break or cut in the material, or another groove. Placing a groove in a sheet is distinguished herein from cutting a sheet into two or more pieces by the presence of a continuing physical coupling of the sections produced by the grooving. Thus, for example, in fabricating a sheet of PSSM for use as a countertop, one side is often taped, and then the sheet is grooved from the opposite side to within a few thousandths of an inch of the tape. In some cases the sheet is grooved to an even closer tolerance, and the sheet may even be grooved all the way through to the backing tape, lamination, or other connecting composition.

The grooves contemplated herein may have many different cross-sectional shapes, including "V", "U", and notch shapes, and may even have different cross-sectional shapes at different lineal positions. In FIGS. 1A and 2A the "V" shaped grooves have an angle of approximately 45°, and although it is not apparent in the drawings, the side walls of the grooves 22, 24, 122 and 124 closer to the recesses 26, 126 may be slightly longer than the opposite side walls to provide a smooth junction when the sheet is folded.

The shape of a groove utilized in production of a joint largely determines the shape of the resulting joint. Thus, for example, the "V" shaped grooves 22, 24, 122, 124 and 132 in FIGS. 1A and 2A produce the simple mitered joints 22A, 24A, 122A, 124A and 132A, respectively, of FIGS. 1B and 2B, while the complex groove 32 of FIG. 1A produces the mitre-lock joint (also referred to herein as a stair-stepped joint) 32A of FIG. 1B. In general, simple mitered joints are satisfactory for many applications, but are less strong than mitre-lock joints because they involve less surface area in which to apply an adhesive or other bonding agent.

Once one or more grooves have been provided in a sheet or other workpiece, whether by cutting, routing or some other means, the workpiece is folded at one or more of the grooves to form a joint. As used herein the term "folding . . . at a groove" means that at least two sidewalls of the groove are juxtaposed, and depending on the depth of the groove relative to the thickness of the workpiece, the juxtaposition may involve bending of the workpiece proper, a supporting structure such as tape or lamination, or some combination of the two. It is not necessary for folding at one or more grooves to produce 90° joints. A sophisticated shower or bath tub surround, for example, may have eight sides in which the joints are all approximately 45°. In other applications, such as the joining of two separate sheets, grooves may provide substantially 180° joints. Even in countertops the backsplash and overhanging edge joints may vary up to 30° or more from the standard inside joint angle of 90°, i.e. between 120° and 60°.

The shape of the joint(s) produced during folding is related to the number and dimensions of the corresponding groove(s), and also to the shape(s) of any sections adjacent the groove(s). For example, the recesses 26 and 126 used in forming cove joints 28A and 128A assist in providing the overall coved appearances, and such recesses are generally contemplated to have a relatively shallow curve as shown. Such curves are often given in terms of radius, with a preferred radius being ⅜ inch. Alternative recesses, however, may have shallower or deeper curves than those shown in FIGS. 1A and 2A, inclines, or more complex curves rather than the simple curves shown in the figures.

Figure 6:
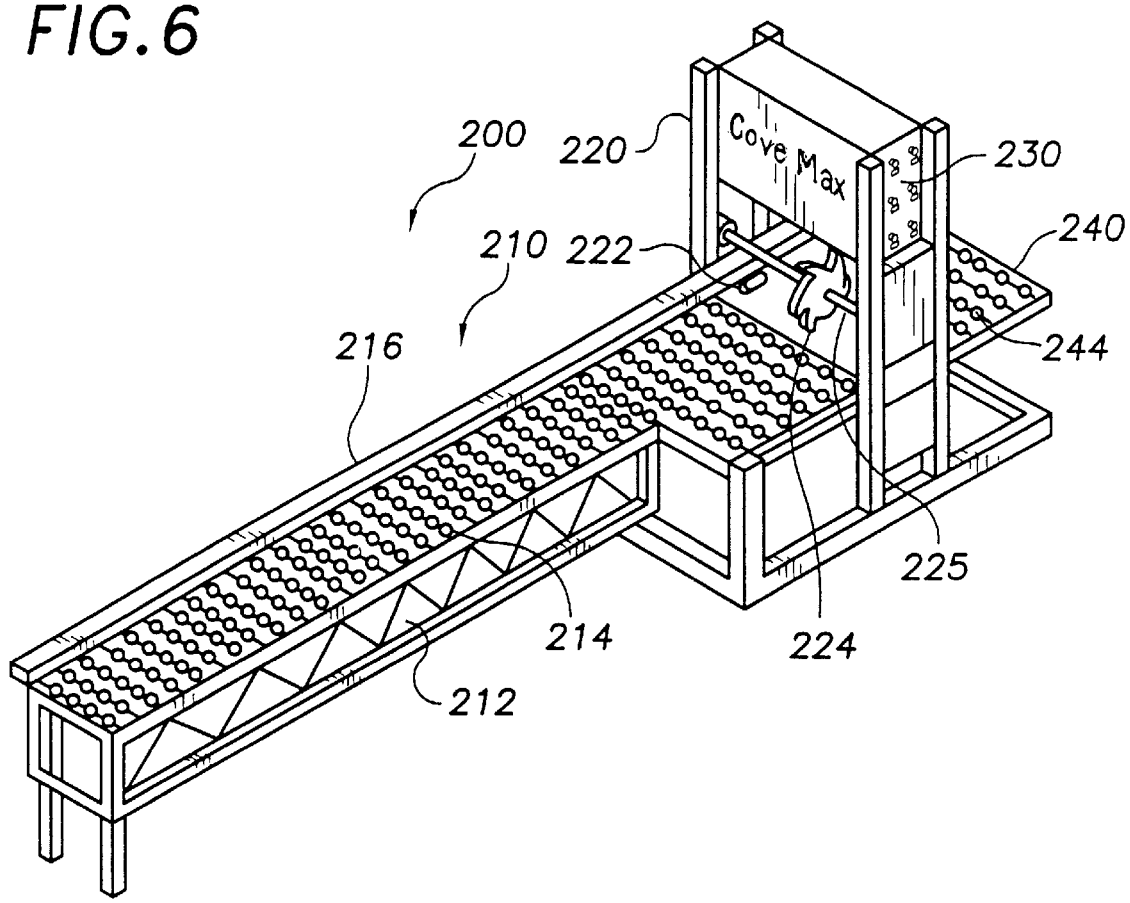
FIG. 6 is a perspective view of a grooving machine according to the inventive subject matter, wherein a portion of the cover to the cutter housing has been removed to show additional detail.

FIG. 6 depicts a preferred embodiment of a machine 200 used in the production of grooves in sheets or other workpieces (not shown) according to the present inventive subject matter. In general, machine 200 comprises a feed table 210, a cutter station 220, a control box 230 and an exit table 240.

The feed table 210 is conventional, having an aluminum, steel or other relatively strong carriage 212, and a plurality of rollers 214 suitable for carrying sheets weighing at least several hundred pounds. A typical feed table may measure approximately 14 ft long by 2.5 feet wide by 3.5 ft high. Here, the rollers are depicted as bidirectional, but in alternative embodiments at least some of the rollers may have additional freedoms of movement, and may be omnidirectional. A movable rail 216 is used to guide sheets of material along the rollers 214. In some embodiments the rail may be movable, and may be used to establish the set-off distance between an edge of the workpiece and a first cutter 222. In such embodiments the rail 216 can be positioned and locked into place using clamps or other positioning and locking mechanisms (not shown). The feed table 210 need not have a substantially linear configuration as shown in FIG. 5, and may alternatively have an "L" or other configuration. Feed table 210 may also provide a common path between multiple cutter stations.

Cutter station 220 has at least two cutters 222 and 224. Cutter 222 is journaled onto a first shaft 223 (not shown), and is intended to cut into the under side of the workpiece. Cutter 224 is journaled onto a second shaft 225, and is intended to cut into the top side of the workpiece. Both cutters 222 and 224 can be moved and then locked into position along their respective shafts 223, 225. The shafts 223, 225 may be powered in any suitable manner, and are advantageously powered by independent electric motors, preferably having at least 15 and 10 horsepower, respectively. The cutters 222, 224 may be conventional, having multiple blades either permanently or removably attached to a cutting "wheel", and the cutting wheel may be substantially round, polygonal, or may have some other overall shape. Of course, the blades are advantageously comprised of steel, tungsten carbide, diamond, ceramic or some other hard substance, and the shapes of the cutting surfaces should be such that the desired groove dimensions are produced in the workpiece. In FIG. 5 the machine 200 is configured to produce grooves in a sheet similar to the pattern of FIG. 1. Thus, cutter 222 produces groove 32 while cutter 224 produces grooves 22, 24 and recess 26. To this end cutter 224 may actually comprise three blades collectively designated 224, as shown. It will also be apparent that the cutters 222 and 224 may be removable for replacement and servicing, and that additional cutters, such as those adapted to make complete cuts rather than grooves, may be installed as appropriate.

Control box 230 provides gauges, switches and other devices by which an operator (not shown) can monitor and control aspects of the machine 200. For example, control box 230 will advantageously have on/off and speed control switch(es) for the motor(s), and may also include positioning readouts and controls for the cutters 222, 224 and shafts 223, 225.

Exit table 240 provides support for the workpiece after it has passed through the cutter station. Exit table 240 preferably contains rollers 244 similar to the rollers 214 employed with the feed table 210.

Figure 7:
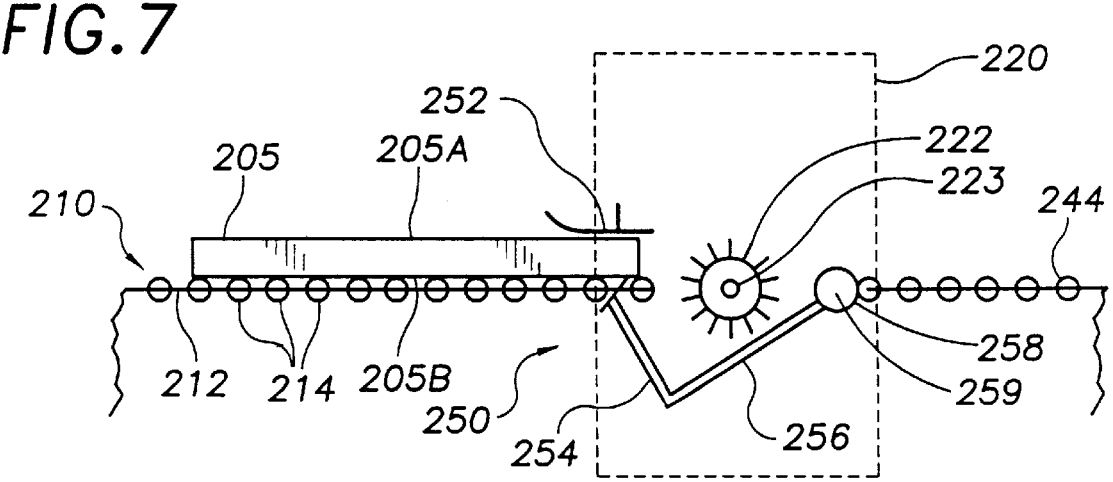
FIG. 7 is a schematic of a mechanism for accommodating varying thicknesses of workpieces.

FIG. 7 is directed to a mechanism 250 for accommodating workpieces having different thicknesses from one another, and varying thicknesses throughout their lengths. The mechanism 250 generally includes a foot 252, a biaser 254, a connecting arm 256 and a positioning cam 258. To place the mechanism in perspective, FIG. 6 also shows the carriage 212 and rollers 214 of feed table 210, a workpiece 205, cutter 222, shaft 223, and the housing of the cutter station 220 (in phantom).

In operation, foot 252 is fixed relative to the feed table 210 via a support arm (not shown), and thereby provides a reference against which biaser 254 biases the upper side of the workpiece 205. Movement of the biaser 254 causes connecting arm 256 to pivot about a pivot 259 running through cam 258, which in turn raises or lowers whatever portion of the workpiece is resting on the cam 258. In a preferred embodiment the biaser comprises a pneumatical cylinder which is charged to about 5 psi. This pressure has been found to be appropriate for dealing with PSSM type worksheets measuring about ¾" in thickness. Of course, many other mechanisms may accomplish a similar function, and in particular, the biaser may include a spring, hydraulic or other biasing means.

The use of machine 200 should be readily apparent from the above description. In general, the rail 216 and relative positions of the cutters 222 and 224 are adjusted, and then the motors (not shown) are turned on at the control panel 230. A workpiece 205 is then fed along the rollers 214 of feed table 210 towards the cutter station 220 until the leading edge of the workpiece 205 is forced between the foot 252 and the head of the biaser 254. Movement of the biaser 254 adjusts the positioning cam 258. The workpiece 205 is then fed through the cutter station 220, and grooves are cut into both the top and bottom of the workpiece. Still another cutter (not shown) may cut off a side of the workpiece during the same process. Finally, the workpiece reaches, and is then removed from the exit table 240.

While not directly apparent from inspection of FIGS. 1–4, it is contemplated herein that grooves and recesses (if applicable) on opposing sides of a workpiece would be cut during the same pass. As used herein, the term "same pass" means that operations are performed on a work piece, which in this case is most likely a sheet of PSSM, without the work piece being completely removed from the machine performing the operation(s). Thus, with respect to FIG. 5, cutters 222 and 224 are positioned to place grooves in the upper 205A and lower sides 205B of the workpiece 205, respectively, without removal of the workpiece 205 from the machine 200. For example, grooves 22, 24, and 32, and recess 26 in FIG. 1A could all be cut during a single pass, and grooves 122, 124, and 132, and recess 126 in FIG. 3 could all be cut during another single pass.

It is important to note that the distinction between "single pass" and "multiple passes" does not depend upon temporal closeness of the operation of the various cutters. As mentioned above, a table could connect two different cutter stations, one of which could cut grooves in the upper side of the workpiece and the other of which could cut grooves in the lower side of the workpiece, all without removing the workpiece from the machine. Such a process would still fall within the definition of a single pass.

Additional guidance can be gleaned by recognizing that all known cutting machines typically used in grooving countertops require multiple passes to cut grooves into both sides of a workpiece. Such machines generally have a table upon which a workpiece is fixedly positioned, and a cutter which moves on a track above the workpiece. The cutter places one or more grooves into the upward facing side of the workpiece, the workpiece is flipped over so that what was the lower side becomes the upper side, the machine is adjusted to cut a different pattern of grooves, and grooves are cut into the newly upward facing side. The fact that the cutter may run back and forth multiple times on the upward facing side of a workpiece does not render the device a multiple pass machine, but the fact that the workpiece needs to be removed from the machine to cut grooves into the opposite side does render the machine a multiple pass machine.

Still further guidance can be gleaned by considering the grooving of especially hard substances such as marble and granite. Despite the fact that workpieces comprising such substances may require several, progressively deeper cuts to produce a sufficiently deep groove, the process would still comprise a single pass as long as the progressively deeper cuts are performed without removing the workpiece from the machine.

Thus, specific embodiments and applications of double-sided, single pass grooving of countertops and other building structures have been disclosed. It should be apparent, however, to those skilled in the art that many more modifications besides those already described are possible without departing from the inventive concepts herein. For example, the cutters need not comprise rotating cutting edges as shown, but may instead comprise routers or even lasers. Similarly, it is possible to position the shafts or other supports upon which the cutters are mounted before and even during each run, rather than positioning the workpiece. The inventive subject matter, therefore, is not to be restricted except in the spirit of the appended claims.

What is claimed is:

1. A method of fabricating a countertop, comprising:
   providing a sheet of material having first and second sides defined by opposing surfaces of the sheet;
   placing a first groove in the first side and a second groove in the second side during a single pass;
   folding the sheet at the first groove.

2. The method of claim 1 wherein the step of folding the sheet comprises producing a backsplash joint.

3. The method of claim 1 wherein the step of folding the sheet comprises producing a coved backsplash joint.

4. The method of claim 1 wherein the step of folding the sheet comprises producing an overhanging edge joint.

5. The method of claim 1 further comprising folding the sheet at the second groove.

6. The method of claim 1 further comprising:
   placing a third groove in the second side of the sheet;
   recessing a length of material between the second and third grooves; and
   folding the sheet at the first and second grooves.

7. The methods of any of claims 1–6 further comprising cutting into the sheet with a plurality of radially mounted blades.

8. The building structures of any of claims 1–6 wherein the sheet comprises a plastic solid surfacing material.

9. The building structure of any of claims 1–6 wherein the sheet comprises a methacrylate resin.

10. A building structure manufactured from a sheet having:
    a first groove in one side of the sheet defined by a surface of the sheet which at least partially defines first and second connected sections, and a second groove in an opposite side of the sheet defined by an opposing surface of the sheet which at least partially defines a third section;
    the first and second sections brought together at the first groove after the second groove is formed, to produce a joint defining an angle of less than 150°.

11. The building structure of claim 10 wherein the angle is between 120° and 60°.

12. The building structure of claim 10 wherein the joint couples a counter portion of a countertop with a backsplash portion of the countertop.

13. The building structure of claim 10 wherein the sheet has an additional groove which cooperates with the first groove to form a coved backsplash joint.

14. The building structure of claim 10 wherein the sheet has an additional groove, about which the sheet is folded to form a scribe strip.

15. The building structure of claim 10 wherein the sheet has at least two additional grooves, about which the sheet is folded to form a bull nose.

16. The building structure of claim 10 wherein the sheet is folded about additional grooves to form a coved backsplash joint and a scribe strip.

17. The building structure of claim 10 wherein the joint comprises a mitre-lock joint.

18. The building structure of claim 10 wherein at least one of the groove forms part of an indexed sheet join.

19. The building structures of any of claims 10–18 wherein the sheet comprises a plastic solid surfacing material.

20. The building structure of any of claims 10–18 wherein the sheet comprises a methacrylate resin.

* * * * *